US006940561B1

(12) United States Patent
Glaab et al.

(10) Patent No.: US 6,940,561 B1
(45) Date of Patent: Sep. 6, 2005

(54) AUTOMATIC MODULATION AND RF CARRIER LEVEL CONTROL OF SYNC SUPPRESSED TELEVISION SIGNALS

(75) Inventors: Joseph B. Glaab, New Hope, PA (US); Alfred W. Stufflet, Norristown, PA (US)

(73) Assignee: General Instrument Corporation, Horsham, PA (US)

( * ) Notice: Subject to any disclaimer, the term of this patent is extended or adjusted under 35 U.S.C. 154(b) by 1050 days.

(21) Appl. No.: 09/705,406

(22) Filed: Nov. 3, 2000

Related U.S. Application Data (63) Continuation of application No. 08/985,438, filed on Dec. 5, 1997, now Pat. No. 6,169,584.

(51) Int. Cl.[7] .............................................. H04N 5/52
(52) U.S. Cl. ........................ 348/724; 348/532; 348/678
(58) Field of Search ................................ 348/724, 532, 348/678, 680, 691, 723, 534; 380/203, 204, 380/210, 221; H04N 5/32, 5/27, 5/18

(56) References Cited

U.S. PATENT DOCUMENTS

| | | | | |
|---|---|---|---|---|
| 3,697,673 A | * | 10/1972 | Dann .......................... | 348/499 |
| 3,753,123 A | * | 8/1973 | Carpenter et al. .......... | 455/304 |
| 3,852,519 A | | 12/1974 | Court | |
| 3,885,089 A | | 5/1975 | Callais et al. | |
| 3,900,823 A | * | 8/1975 | Sokal et al. ................ | 330/149 |
| 4,024,575 A | | 5/1977 | Harney et al. | |
| 4,253,114 A | | 2/1981 | Tang et al. | |
| 4,344,084 A | * | 8/1982 | Engel et al. ................ | 348/605 |
| 4,562,465 A | | 12/1985 | Glaab | |
| 4,568,974 A | | 2/1986 | den Toonder et al. | |
| 4,598,313 A | | 7/1986 | Hendrickson | |
| 4,598,318 A | | 7/1986 | Robbins | |
| 4,665,427 A | | 5/1987 | Beckley et al. | |
| 4,718,086 A | | 1/1988 | Rumreich et al. | |
| 4,739,510 A | | 4/1988 | Jeffers et al. | |
| 4,747,159 A | | 5/1988 | Kato | |
| 4,790,011 A | | 12/1988 | Bellavia, Jr. | |
| 4,852,164 A | | 7/1989 | Suzuki | |
| 4,870,370 A | * | 9/1989 | Hedberg et al. ............ | 330/133 |
| 4,924,498 A | | 5/1990 | Farmer et al. | |
| 4,952,886 A | * | 8/1990 | Braathen et al. ............ | 330/279 |
| 5,142,575 A | | 8/1992 | Farmer et al. | |

(Continued)

Primary Examiner—Vivek Srivastava
(74) Attorney, Agent, or Firm—Lawrence T. Cullen (57) ABSTRACT

The depth of modulation and the absolute RF carrier level of an amplitude-modulated video signal are automatically adjusted. For adjustment of the depth of modulation, a sync tip of the video signal is sampled, corrected and normalized to a reference level, e.g., a 50% video level. A reference pulse is inserted into the video signal, e.g., in a sync pulse or in lines 22 and/or 23 of the vertical blanking interval. The reference pulse is sampled and compared to the normalized sync tip pulse to determine an error. The error is converted to an adjustment signal for a charge pump which increases or decreases the depth of modulation accordingly. For adjustment of the absolute carrier level, the insertion of a reference pulse is not required. Instead, a reference value is stored in a memory and retrieved for comparison with the corrected sync tip pulse. An error term is computed and converted to an adjustment signal for a charge pump which increases or decreases the absolute carrier level accordingly. Several modulation circuits can share a common microprocessor controller.

26 Claims, 8 Drawing Sheets

U.S. PATENT DOCUMENTS

| | | |
|---|---|---|
| 5,146,496 A | 9/1992 | Westerfer et al. |
| 5,177,787 A | 1/1993 | Murphy et al. |
| 5,231,660 A | 7/1993 | West, Jr. |
| 5,270,819 A | 12/1993 | Watson |
| 5,467,141 A | 11/1995 | Ligertwood |
| 5,499,392 A * | 3/1996 | Grunwell .................... 455/260 |
| 5,771,224 A * | 6/1998 | Seki et al. .................. 370/206 |
| 5,805,551 A | 9/1998 | Oshima et al. |

\* cited by examiner

MODULATED CARRIER
FIG.4

AUTOMATIC MODULATION AND RF CARRIER LEVEL CONTROL OF SYNC SUPPRESSED TELEVISION SIGNALS

This application is a continuation of U.S. patent application Ser. No. 08/985,438 filed Dec. 5, 1997 now U.S. Pat. No. 6,169,584.

BACKGROUND OF THE INVENTION

The present invention relates to methods for automatically controlling the amplitude modulation of video signals. Both the absolute carrier level and the depth of modulation are controlled. The invention is suitable for use with unscrambled television signals as well as television signals that have the horizontal synchronization pulse suppressed to prevent detection of the signals by unauthorized persons, e.g., pirates.

A composite video signal such as one which conforms to the NTSC standard includes picture luminance and chrominance information as well as timing information for the synchronization of scanning and color processing circuits at a receiver. At the end of each line scan at the receiver, a horizontal synchronizing pulse (HSYNC) commands the scanning circuit to return the scanning beam to the left of the screen to begin scanning a new line. Similarly, at the completion of each field or frame, a vertical synchronizing pulse (VSYNC) commands the scanning circuit to return to the top of the screen to begin scanning the next field or frame. The return period is known as the vertical blanking interval.

Accordingly, the television signal may be scrambled by altering the normal position and/or amplitude of the synchronization pulses. Such techniques for scrambling the video portions of television signals are well known. For example, U.S. Pat. No. 3,813,482 to Blonder discloses a system for transmitting television signals where the video is scrambled by suppressing the vertical or horizontal synchronization pulses to produce a shifting or rolling scrambled picture. U.S. Pat. No. 4,542,407 to Cooper et al, discloses an apparatus for scrambling and descrambling television programs in which the horizontal synchronization information is suppressed at a cable television (CATV) headend, and then regenerated by a subscriber's cable television converter. U.S. Pat. No. 4,095,258 to Sperber, U.S. Pat. No. 4,163,252 to Mistry et al., and U.S. Pat. No. 4,571,615 to Robbins et al. describe schemes for decoding scrambled television signals.

In particular, by suppressing the horizontal synchronization pulses below the average value of the active video, a television receiver attempts unsuccessfully to lock horizontally on to random peaks of the active video rather than the HSYNC pulses. Additionally, the loss of effective horizontal synchronization prevents the receiver from properly utilizing the color burst signal which is associated with the HSYNC pulse, so that color reproduction is also faulty.

In order for a receiver to restore (i.e., descramble) the scrambled video signal, the suppressed synchronization pulses must be restored. This may be accomplished by amplitude modulating timing pulses on the FM audio carrier of the television signal. The pulses are then detected in the audio portion of the receiver and used to generate the timing signals necessary to descramble the received video signal. Alternatively, a portion of the sync timing pulses is transmitted without suppression, for example, during the vertical blanking interval. The receiver is phase-locked to the unsuppressed signals to create the required timing and synchronization information for descrambling the video portion of the signal.

Further scrambling of a television signal may be achieved by inverting a portion of the active video such as described in U.S. Pat. No. 4,598,318 to Robbins.

Generally, amplitude modulation of the active video is achieved by varying the amplitude of an RF carrier signal about a fixed level. The variation in amplitude is known as the depth of modulation. Additionally, synchronization signals can be suppressed to −6 dB or −10 dB below the unsuppressed level which is specified by the transmission standard which is used, e.g., −40 IRE for NTSC signals. The suppression level may be varied with time, for example, according to detected scene changes in the active video. Switching may occur several times per second, or more slowly, such as once every several seconds. Conventionally, a stable amplitude modulator is used with automatic gain control of the video signal.

However, suppression and subsequent restoration of synchronization pulses is hampered by variations in amplitude modulation equipment, which may be at a CATV headed or a remote location, for example. Conventional RF carrier circuitry is subject to drift and other inaccuracies due to humidity and temperature variations, as well as changes due to degradation over the lifetime of the equipment, for example. Modulation level discrepancies can cause flickering or other undesirable brightness changes in the recovered video image.

Thus, such modulating circuitry must be periodically adjusted by a technician using metering equipment to ensure accuracy. This solution is inefficient, in particular, when the modulation circuitry is remotely located. Additionally, the problem of drift in the modulation accuracy is not solved.

Accordingly, it would be desirable to have a system for automatically controlling the amplitude modulation level and depth of modulation of a television signal. The system should be suitable for use with sync suppressed signals, including signals with VSYNC and/or HSYNC suppression, as well as non-suppressed signals. The system should be suitable for use with multiple levels of sync suppression. The system should also be suitable for use with signals with normal (e.g., non-inverted) as well as inverted active video portions.

The system should further be relatively inexpensive to manufacture and install, and should require only a low-speed microprocessor controller. The system should provide an assembly with a common microprocessor controller which services a number of individual modulation circuits on a time-sharing basis.

The present invention provides a system having the above and other advantages.

SUMMARY OF THE INVENTION

In accordance with the present invention, methods are presented for automatically controlling the amplitude modulation of a video signal.

In one embodiment, an automated modulation circuit for processing a video signal comprises means for detecting a comparison portion in the video signal having an associated amplitude. The comparison portion may be a horizontal or vertical synchronization pulse. For example, a horizontal sync pulse may have a sync pulse tip at −40 IRE (at baseband) for a non-scrambled video signal. Means are provided for normalizing the comparison portion amplitude according to a reference level. The reference level may correspond to a video level, e.g., 50 IRE, about which inversion of the active video occurs. However, inversion is not required. Normalization involves scaling the comparison portion to the reference level using a multiplier.

Means are provided for detecting a reference pulse having a reference pulse amplitude at the reference level in the video signal. For example, a reference pulse may be provided in a horizontal or vertical sync pulse, or in a vertical blanking interval. The reference pulse may serve as an inversion level pulse when inversion occurs.

Means are provided for generating a first error signal corresponding to a difference between the normalized sync pulse tip amplitude and the reference pulse amplitude. For example, sample and hold circuits may obtain samples of the sync pulse tip and the reference pulse. An A/D converter converts the samples to digital form for processing by a microprocessor controller, which then determines an appropriate error signal based on the relative magnitudes of the two samples.

Means responsive to the first error signal adjusts a depth of modulation of the video signal. The first error signal can bias the video signal prior to modulation by an RF carrier.

When the sync pulse tip is attenuated, e.g., in a scrambled signal, means are provided for correcting the comparison portion amplitude to remove the attenuation. For example, a comparison portion which is a sync pulse tip may be attenuated by 6 dB or 10 dB, in which case appropriate multipliers are used to restore the sync pulse tip to the −40 IRE level, or to another non-attenuated level depending on the video standard in effect.

The means for generating a first error signal generates an error signal corresponding to a difference between the normalized and corrected comparison portion amplitude and the reference pulse amplitude.

The means responsive to the first error signal for adjusting a depth of modulation of the video signal comprises a microprocessor controller for converting the first error signal to a first adjustment signal. This may be achieved, for example, using a memory which stores a look up table for converting the error signal to an adjustment signal. Threshold ranges may be used to provide a range where a zero or near zero error signal results in a zero adjustment signal. The adjustment signal may further be a function of a bit error of the error signal. A first charge pump receives the adjustment signal and provides a corresponding modulation depth control signal, which is coupled to bias the video signal prior to modulation of the video signal by an RF carrier.

Moreover, while the comparison portion may be compared to a 50% video level, for example, other comparison portions and reference portions of the video signal may be used. For example, it is possible to compare a blanking level to the 50% video level or to another video level, or to compare the sync tip level to the blanking level.

An RF carrier reference level corresponding to an RF carrier of the video signal may be provided. This may be a value which is stored in memory and retrieved for later use by the microprocessor. Means are provided for generating a second error signal corresponding to a difference between the sync pulse tip amplitude prior to normalizing and the RF carrier reference level. Means responsive to the second error signal adjusts an amplitude of the RF carrier. For example, the second error signal may be coupled to a voltage controlled attenuator (VCA) for adjusting the output of an RF carrier generator. The video signal at baseband is then modulated on to the adjusted RF carrier.

The means responsive to the second error signal for adjusting an amplitude of the RF carrier comprises a microprocessor controller for converting the second error signal to a second adjustment signal. For example, the same microprocessor controller may be used for processing the first and second error signals on a time sharing basis. A second charge pump receives the second adjustment signal and provides a corresponding RF amplitude control signal.

Thus, automated control can be provided for both the depth of modulation and the absolute RF carrier level to correct for drift and other inaccuracies which may occur over time, or to provide a more constant channel power, if that is a goal.

An automated modulation assembly for processing a plurality of video signals comprises a plurality of the above-described circuits. Manufacturing several, e.g., four, of the modulation circuits on a common assembly can provide an economical apparatus since a single microprocessor control and associated memory can be shared by the individual modulation circuits on a time-sharing basis. Each individual modulation circuit is used for modulating a corresponding video signal, e.g., channel or programming service.

The microprocessor controller converts the first error signal of each of the individual circuits to corresponding first adjustment signals. Each circuit includes its own first charge pump for receiving the corresponding first adjustment signal and providing a corresponding modulation depth control signal.

In a second embodiment, an automated modulation circuit for processing a video signal comprises means for detecting a comparison portion with an associated amplitude, means for providing an RF carrier reference level corresponding to an RF carrier of the video signal, means for generating an error signal corresponding to a difference between the comparison portion amplitude and the RF carrier reference level, and means responsive to the error signal for adjusting an amplitude of the RF carrier.

DETAILED DESCRIPTION OF THE INVENTION

Methods and apparatus are presented for automatically controlling the amplitude modulation of video signals.

Figure 1:
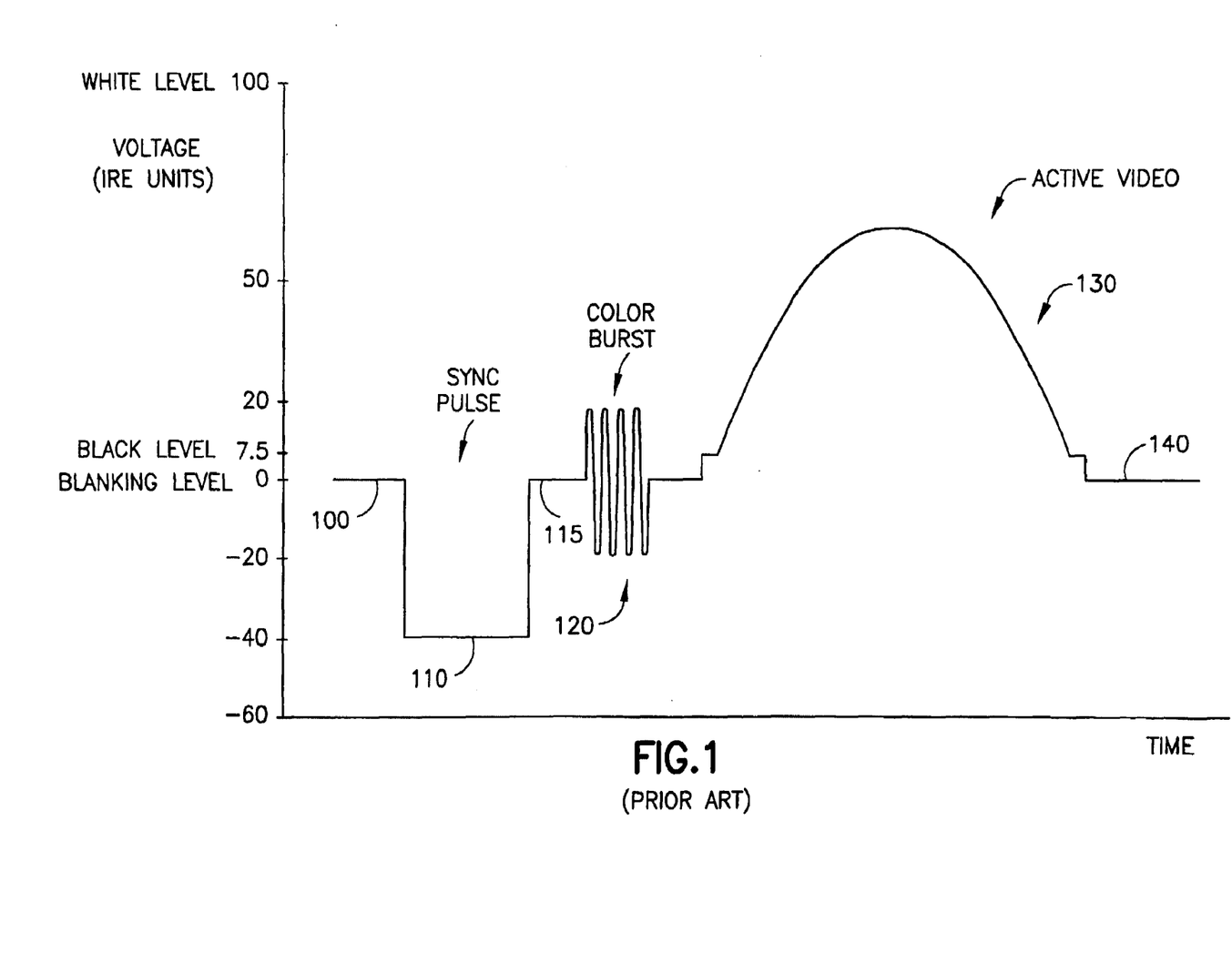
FIG. 1 illustrates an amplitude versus time sketch of a conventional television signal.

FIG. 1 illustrates an amplitude versus time sketch of a conventional television signal. The trace shown is a baseband signal since it has not yet been modulated with an RF carrier. The amplitude of the voltage of the signal is expressed in IRE units as established by the Institute of Radio Engineers in the example shown. A blanking level (i.e., front porch) 100, corresponding to zero IRE units precedes a sync pulse 110, which is at a synchronization level of −40 IRE. The sync pulse shown is a horizontal sync pulse, although the invention can be used alternatively, or in addition, with a vertical sync pulse, or other predetermined level. Moreover, the sync level shown denotes an unscrambled signal. With a scrambled signal, the sync pulse is attenuated from the level shown by −6 dB or −10 dB, for example. The invention may be used with scrambled or unscrambled signals.

Another blanking level signal (i.e., back porch) 115 follows the sync pulse 110. Next, a color burst 120, which is 8–10 cycles at 3.58 MHz, is provided. Subsequently, an active video region 130 is provided. The active video region is shown having a smooth curved shape for simplicity. Another blanking level 140 follows the active video 130.

Suppression of the sync pulse 110 can be achieved by passing the amplitude-modulated television signal through a 6 dB or 10 dB attenuator during a sync suppression time which extends for a period of about 12 $\mu$sec., namely from 1.8 $\mu$sec. before the sync pulse 110 to about 5.7 $\mu$sec. After the sync pulse 110.

The power level of a transmitted scrambled signal can be increased, e.g., by 3 dB when the sync tip is suppressed to improve the overall signal-to-noise ratio.

Figure 2:
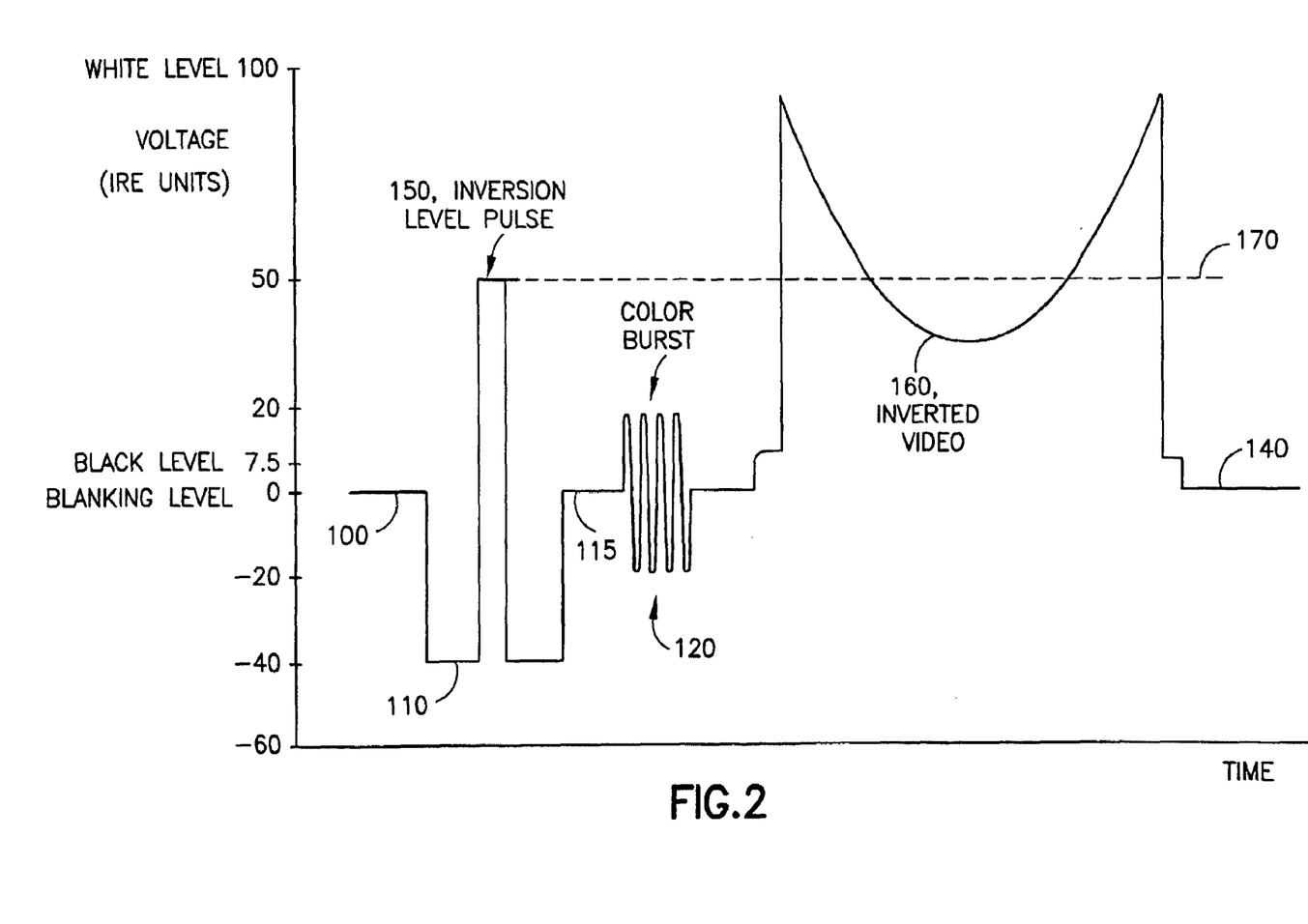
FIG. 2 illustrates an amplitude versus time sketch of a television signal with an inverted video portion and an inversion level (reference) pulse.

FIG. 2 illustrates an amplitude versus time sketch of a television signal with an inverted video portion. With this scrambling technique, as disclosed in U.S. Pat. No. 4,598,318 to Robbins, an inversion level pulse 150 is provided in the sync pulse 110 to designate an amplitude level about which the active video is inverted. In the example shown, the inversion level pulse has an amplitude of 50 IRE, so the active video is inverted about an amplitude, shown by a line 170, at 50 IRE. The inverted video 160 is essentially a mirror image of the non-inverted active video 130 of FIG. 1. All or only randomly selected lines of a video field or frame may be inverted. 50 IRE is a convenient level to use since it is half way between the white level at 100 IRE and the blanking level at 0 IRE. 50 IRE may be considered to be a 50% video level since the video extends from 0–100 IRE. This should not be confused with percent depth of modulation discussed below.

Other inversion levels may be used, such as 30 IRE, which is the midpoint of the range from −40 to 100 IRE. The reference pulse may be provided in addition to the inversion level pulse when the two differ, but it is convenient to use the inversion pulse as a reference pulse if possible. Any signal which has active video below the blanking level is assumed to be inverted, since somewhere in every field there would be some gray (white) video normally.

In accordance with the present invention, the pulse 150 can serve as a reference level for adjusting the modulation of the television signal. Even if the active video is not inverted, and/or the sync pulse is not attenuated, the reference pulse 150 can be inserted into the sync pulse 110 or other predetermined location in the video signal. For example, lines 22 and/or 23 of the vertical blanking interval may be used. Use of these lines makes it difficult to observe when inversion on line 24 takes place. Any modulator can be modified to provide the reference pulse.

Figure 3:
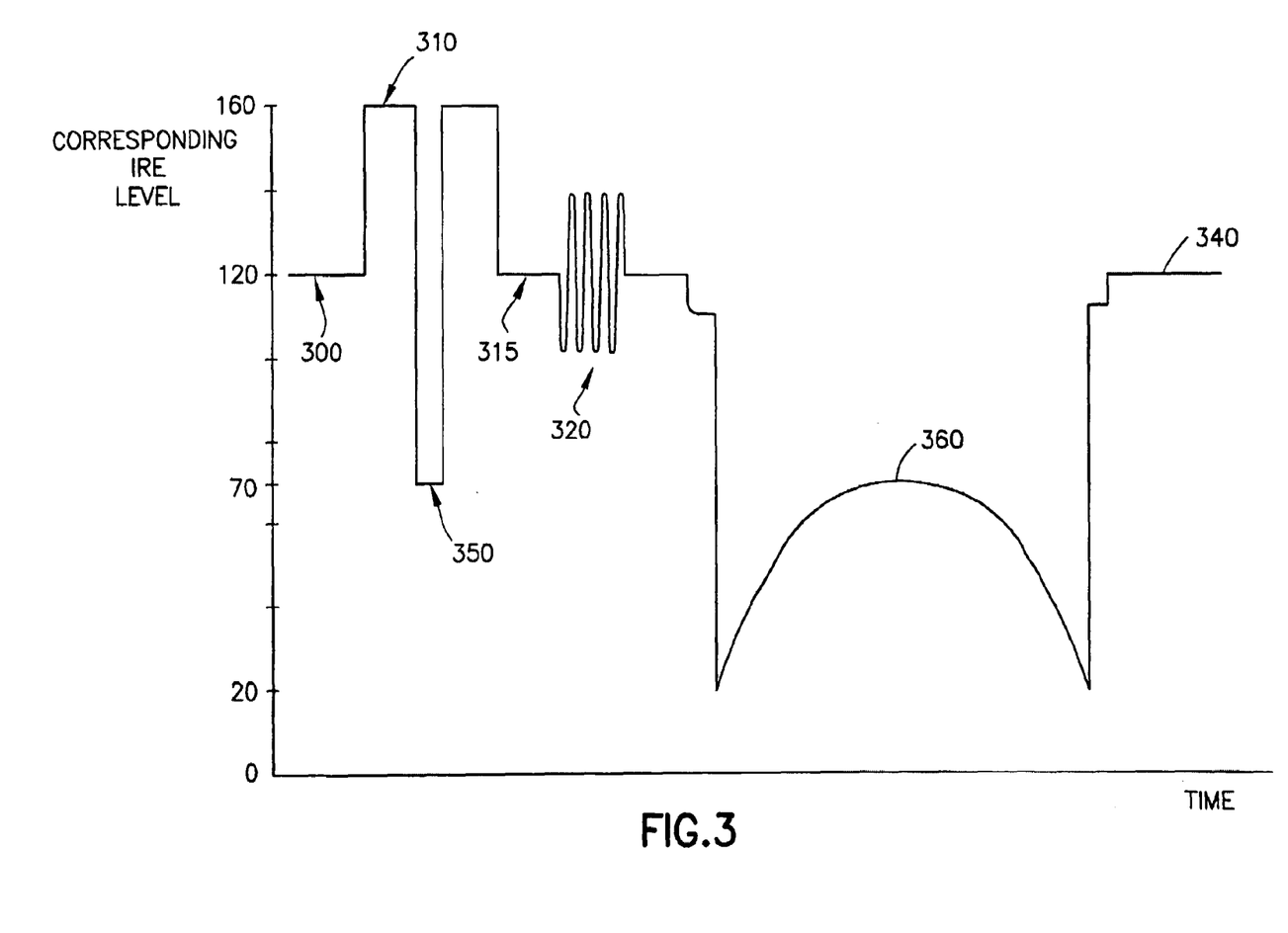
FIG. 3 illustrates a modulated carrier in accordance with the present invention.

FIG. 3 illustrates a modulated carrier in accordance with the present invention. The modulated carrier corresponds to the baseband signal of FIG. 2. The corresponding IRE level of the modulated carrier is shown on the vertical axis. The modulated carrier is obtained by modulating the baseband signal of FIG. 2 with an RF sine wave carrier, for example, at 45.75 MHz. The baseband signal is in the range from 0–4.2 MHz with the NTSC standard. The waveform is essentially symmetric about a central horizontal axis at the corresponding IRE level of zero. Regions 300, 310, 350, 315, 320, 360 and 340 correspond, respectively, to regions 200, 210, 250, 215, 220, 260 and 240 in FIG. 2.

The sync tip 310 is assumed to be at a corresponding IRE level of 160, whether it is suppressed or not, while the inversion pulse 350, which represents a 50% video level (50 IRE at baseband), is at an IRE level of 70. Thus, to normalize the sync tip to the 50% video level, the sync tip should be multiplied by a factor of 70/160=0.4375. In other words, in the modulated signal, the signal voltage of the 50% reference level is 43.75% of the signal voltage of the sync tip. This corresponds to a depth of modulation of 90/160=0.5625 or 56.25% since the 70 IRE level is 90 IRE below the 160 IRE level. The 0 IRE level corresponds to a depth of modulation of 160/160=100%. Generally, the region between 87.5% and 100% modulation depth is maintained to permit intercarrier detection of the audio signal, so the 20 IRE level at 87.5% depth of modulation is the maximum realized.

Likewise, to normalize the blanking level at 120 IRE to the 50% reference level at 70 IRE, the blanking level should be multiplied by a factor of 70/120=0.583. To normalize the sync tip at 160 IRE to the blanking level at 120 IRE, the sync tip should be multiplied by a factor of 120/160=0.75. Generally, any comparison portion can be compared to any reference portion of the video signal by using an appropriate multiplier. Other examples can be realized in view of the above.

As will be seen, it is possible to normalize a comparison portion of the modulated video signal to a reference level to determine whether the depth of modulation is correct.

Figure 4:
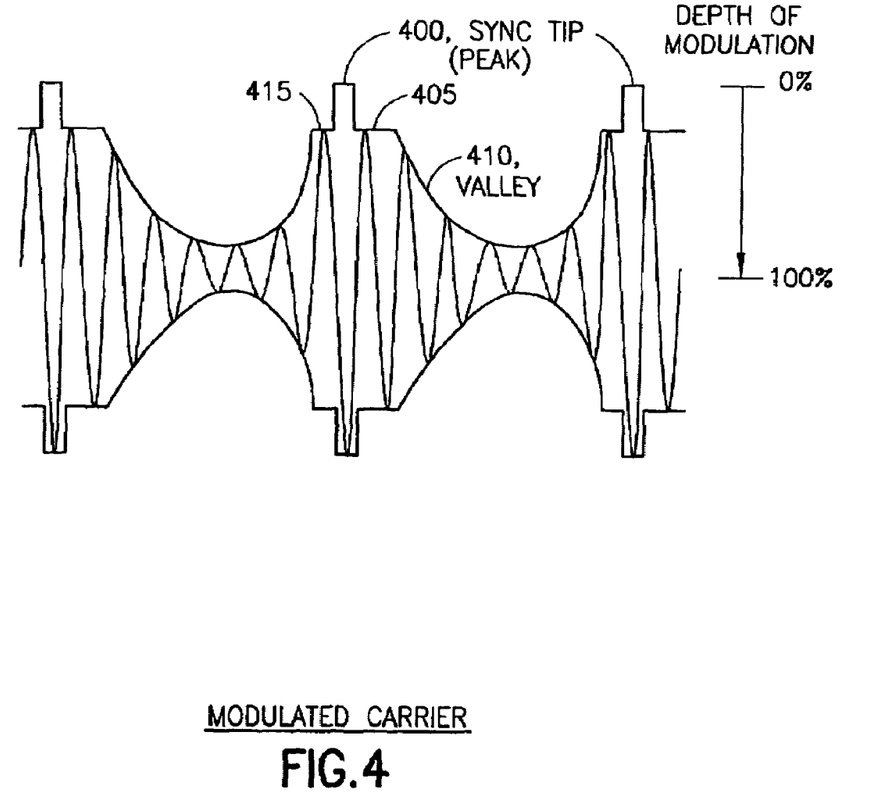
FIG. 4 illustrates a number of cycles of a modulated carrier in accordance with the present invention.

FIG. 4 illustrates a number of cycles of a modulated carrier in accordance with the present invention. The signal shows a non-inverted active video portion with a valley 410 which corresponds to the peak of the active video 130 of FIG. 1. Sync tip peaks 400 correspond to the peak 310 of FIG. 3. Regions 405 and 415 correspond to regions 315 and 300, respectively, of FIG. 3. The depth of modulation is shown extending from 0% at the sync tip peak to 100% at the zero signal level. The negative amplitudes of the signal are a mirror image of the positive amplitudes.

Figure 5:
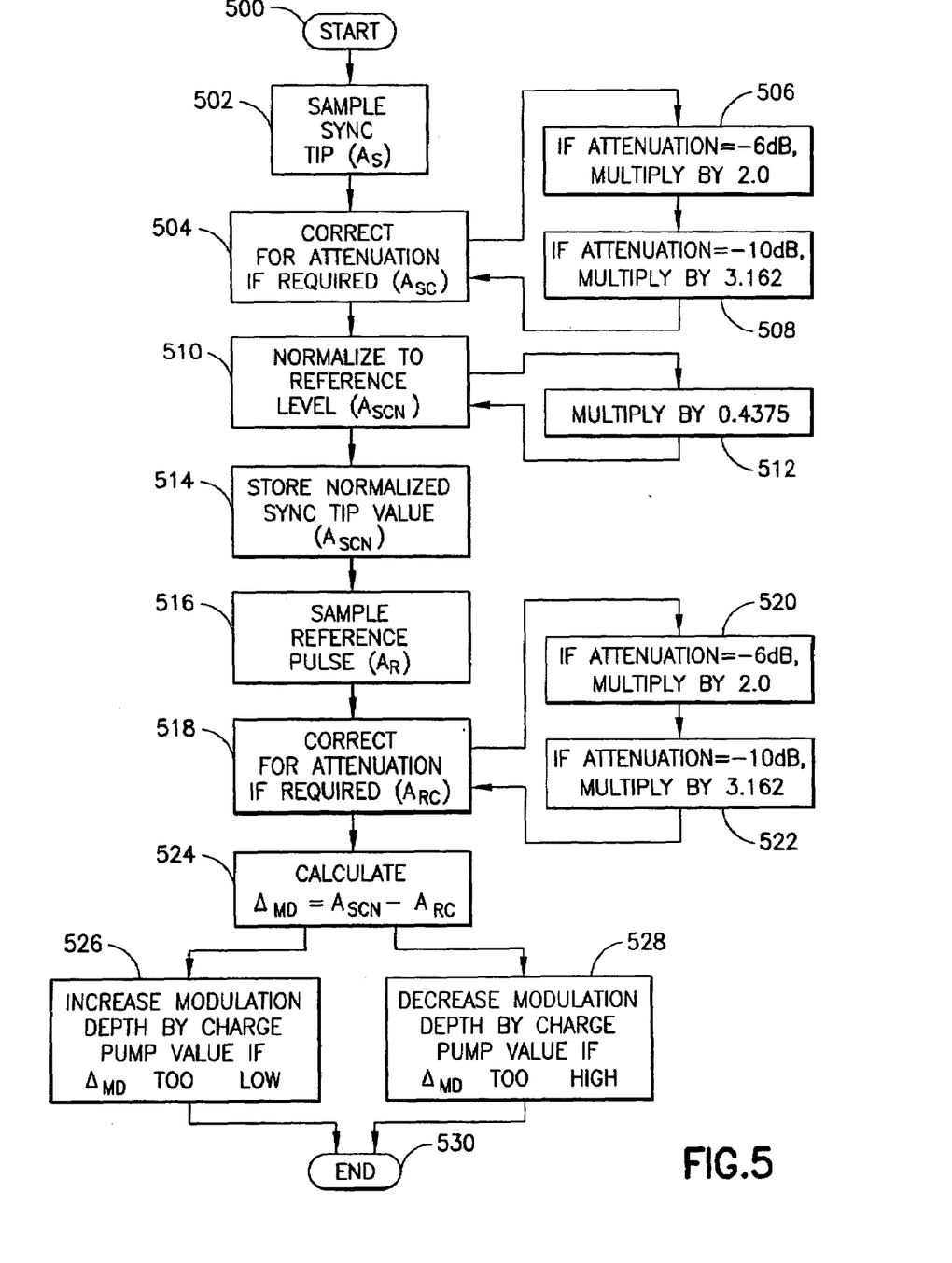
FIG. 5 illustrates an automatic modulation depth control process in accordance with the present invention.

FIG. 5 illustrates an automatic modulation depth control process in accordance with the present invention. The process starts at block 500. At block 502, the sync tip of the television signal is sampled. This value, designated $A_S$, may correspond to −40 IRE (at baseband), −6 dB or −10 dB of a non-attenuated level, or some other attenuated level. At block 504, the sampled sync value is corrected for attenuation, if required. For example, at block 506, if the attenuation is −6 dB, $A_S$ is multiplied by 2.0 to obtain the corrected value $A_{SC}$ (since—20*$\log_{10}$(2.0)=−6). At block 508, if the attenuation is −10 dB, $A_S$ is multiplied by 3.162 to obtain the corrected value $A_{SC}$ (since −20*$\log_{10}$(3.162)=−10). If the television signal is not scrambled, e.g., in the clear, the sync tip will not be suppressed, so processing will continue directly at block 510, thereby bypassing blocks 506 and 508. Regarding blocks 506 and 508, other multipliers should be used if other attenuation levels are used.

At block 510, the corrected sync tip sample, $A_{SC}$, is normalized to a reference level. For example, to normalize $A_{SC}$ to a value of 50 IRE (at baseband), as discussed previously, $A_{SC}$ is multiplied by 0.4375 at block 512. Sampling may be realized using an eight bit A/D converter which is built into a microprocessor. Multiplication by 0.4375 (7/16)

can be achieved using integer arithmetic by performing four right shifts to obtain 1/16 of the original value, right shifting the original value once to obtain 1/2 of the original value, then subtracting the 1/16 value from the 1/2 value to obtain 7/16 of the original value.

For example, assume an arbitrary $A_{SCN}$ of 221 in decimal, denoted $221_{10}$, or in binary, $11011101_2$. Right shifting once yields 01101110 (e.g., $110_{10}$ or 221/2). Right shifting twice yields 00110111 (e.g., $55_{10}$ or 221/4). Right shifting three times yields 00011011 (e.g., $27_{10}$ or 221/8). Right shifting four times yields 00001101 (e.g., $13_{10}$ or 221/16). Subtraction can be performed using 2's complement notation. Specifically, the 221/2 value (01101110) is added to the 2's complement of the 221/16 value, namely 11110011, to obtain $01100001 = 97_{10=221}*(7/16)$.

Virtually any reference level may be selected. For example, it is possible to compare a blanking level which is normalized using an appropriate multiplier to the 50% video level or to another video level. Specifically, for a 50% video reference level, a multiplier of 0.583 is used as discussed in connection with FIG. 3.

Alternatively, the sync tip level may be normalized and corrected using an appropriate multiplier for comparison with the blanking level. For example, a multiplier of 0.75 is used as discussed in connection with FIG. 3. Correction of the attenuation of the sync tip level is performed if required.

Generally, any predetermined portion of the video signal may be compared to any selected reference level, with appropriate correction and normalization. The portion of the signal which is compared to the reference level may be referred to as a "comparison portion" of the video signal, while the reference level is obtained from a "reference portion" of the video signal. For example, it may be desirable to use a comparison portion other than the sync tip since the use of the sync tip is sometimes a problem when it is compressed by the modulation process.

The example of FIG. 5, where the sync tip is compared to the 50% video level is convenient since 50 IRE is often taken as an inversion level for television signals which use inversion of the active video to enhance scrambling. Generally, the sync tip sample is normalized according to the level of the reference pulse which will be sampled for comparison with the normalized sync tip sample. At block 514, the normalized and corrected sync tip value $A_{SCN}$ is stored for later use, e.g., at block 524, discussed below, and/or block 612, discussed in connection with FIG. 6.

At block 516, the reference pulse is sampled to obtain a reference value $A_R$. As mentioned in regard to FIG. 3, the reference pulse may be an inversion level pulse in a sync pulse which is used for inverting the active video. The reference pulse is inserted in the video signal even if no inversion or other scrambling is performed. For example, the reference pulse may be inserted in line 22 of the vertical blanking interval. At blocks 518, 520 and 522, $A_R$ is corrected for attenuation, if required, in the same manner as discussed above in connection with blocks 504, 506 and 508, respectively, to obtain the corrected reference value $A_{RC}$.

At block 524, a modulation depth delta term $\Delta_{MD}$ is calculated as $\Delta_{MD} = A_{SCN} - A_{RC}$. Essentially, $A_{SCN}$ is what the signal level should be at the reference level of modulation depth, and $A_{RC}$ is what the signal level is. Thus, at block 526, if $\Delta_{MD}$ is too low, e.g., less than zero, or less than a threshold value below zero, the modulation depth should be increased. This can be accomplished by increasing a charge pump value as discussed in connection with FIG. 7. At block 528, if $\Delta_{MD}$ is too high, e.g., greater than zero, or greater than a threshold value above zero, the modulation depth should be decreased. This can be accomplished by decreasing a charge pump value. The threshold value may correspond to a one-bit error when integer arithmetic is used. Generally, the resolution of the error depends on the demodulator linearity and A/D resolution. The adjustment (i.e., correction) resolution is usually set to make each adjustment step smaller than the measured error. Even with that condition, single bit errors can be ignored, and two-bit errors can be treated as if they were one bit errors. Alternatively, a threshold value of zero may be used. The threshold value essentially defines a band or range about zero where no modulation adjustment occurs.

The process ends at block 530, but is periodically repeated for each channel. It may be desirable to process a subsequent sample from the same channel, or to process samples from other channels on a rotating basis. The rate of drift of the modulation circuitry is expected to be relatively small, so the period for repeating the process can be relatively long, e.g., several seconds or minutes or even longer. Since the repetition frequency is small, low speed, inexpensive circuitry can be used. Additionally, a single microprocessor can be used for the modulation circuitry of several different channels.

Figure 6:
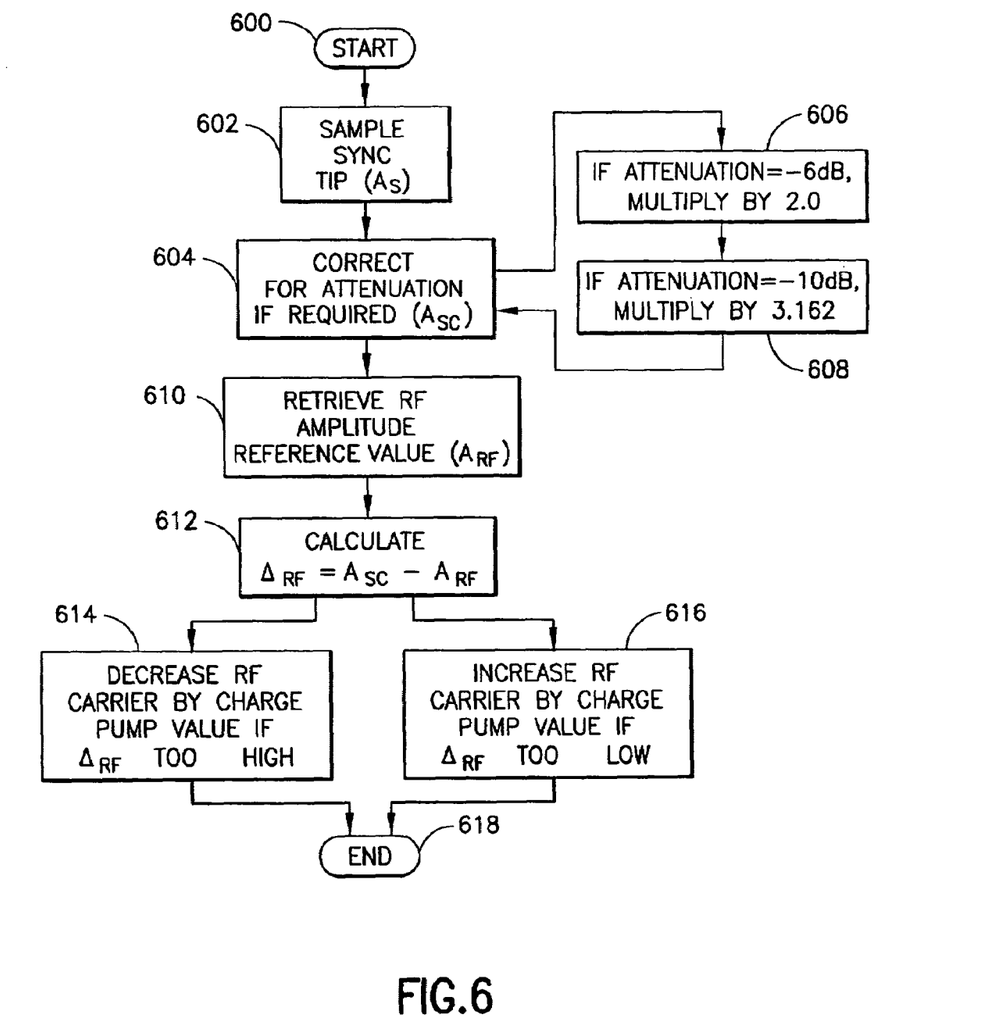
FIG. 6 illustrates an automatic RF carrier level control process in accordance with the present invention.

FIG. 6 illustrates an automatic RF carrier level control process in accordance with the present invention. The process may be combined with the process of FIG. 5, or used in a separate control loop. The process begins at block 600. At block 602, a comparison portion such as a sync tip sample value $A_S$ is obtained. This may be the same as block 502 in FIG. 5, in which case the sample may be obtained from memory if stored previously. Blocks 604, 606 and 608 correspond to blocks 504, 506 and 508, respectively, of FIG. 5.

At block 610, an RF amplitude reference value $A_{RF}$ is retrieved. This reference portion may be the expected value of 100% of the RF sine wave which is combined with the baseband television signal to obtain a modulated television signal. This reference value, which depends on the particular modulation equipment used, can be retrieved from a memory under the control of a microprocessor.

At block 612, an RF amplitude delta term $\Delta_{RF}$ is calculated as $\Delta_{RF} = A_{SC} - A_{RF}$. Essentially, $A_{RF}$ is what the signal level should be, and $A_{SC}$ is what the signal level is. Thus, at block 614, if $\Delta_{RF}$ is too high, e.g., greater than zero, or greater than a threshold value above zero, the RF carrier amplitude should be decreased. This can be accomplished by decreasing a charge pump value as discussed in connection with FIG. 7. At block 616, if $\Delta_{RF}$ is too low, e.g., less than zero, or less than a threshold value below zero, the RF carrier amplitude should be increased. This can be accomplished by increasing a charge pump value. The threshold value may correspond to a one bit error when integer arithmetic is used. Alternatively, a threshold value of zero may be used.

The process ends at block 618, but is periodically repeated for each channel (e.g., programming service). It may be desirable to process a subsequent sample from the same channel, or to process samples from other channels on a rotating, e.g., time sharing, basis.

The RF carrier level control process may generally use any comparison portion and any reference portion. For example, the comparison portion may be a sync pulse tip or a blanking level, and the reference portion may be a blanking portion or 50% video level.

Figure 7:
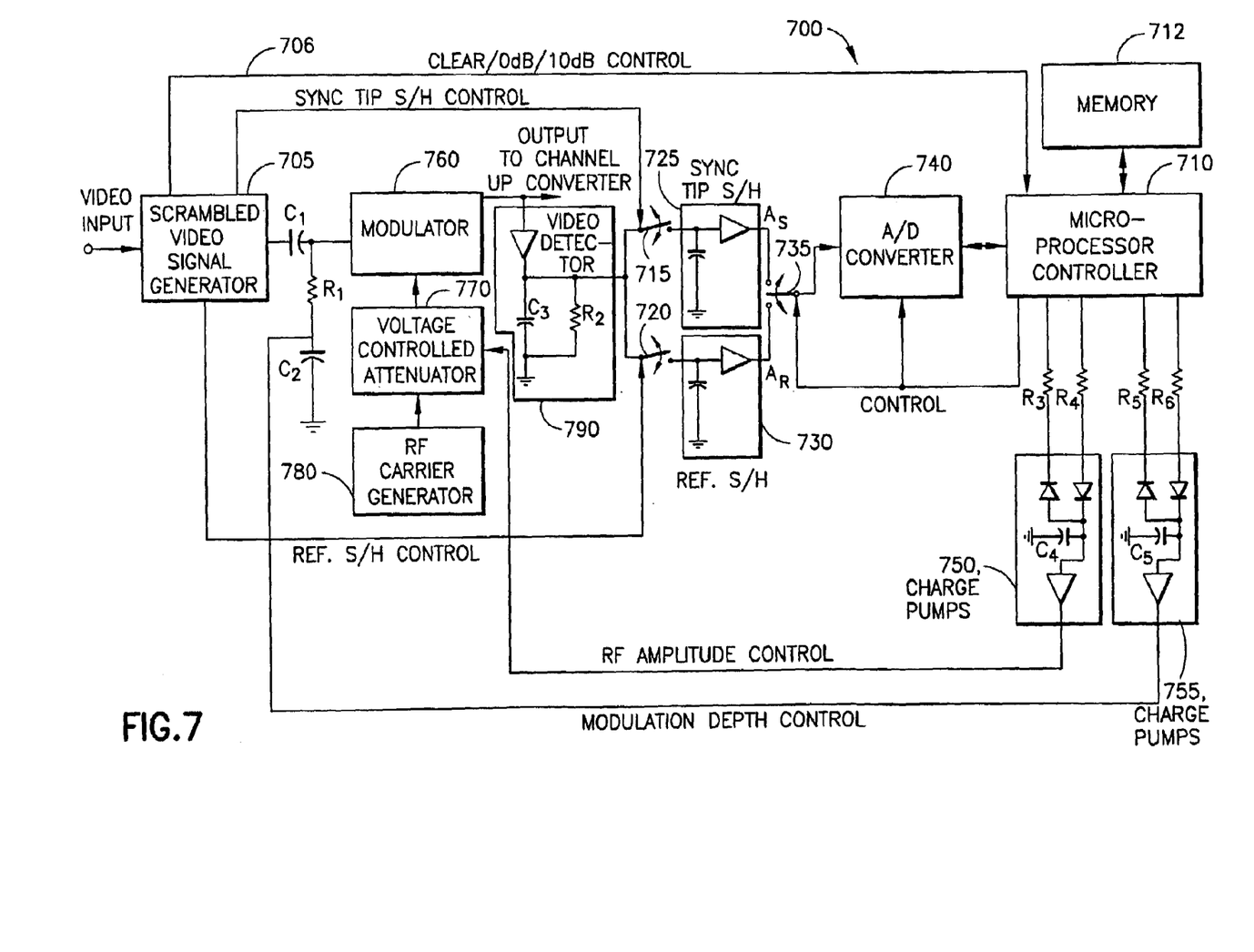
FIG. 7 is an illustration of an automatic modulation control circuit in accordance with the present invention.

FIG. 7 is an illustration of an automatic modulation control circuit in accordance with the present invention. The circuit, shown generally at 700, may be located at the headend of a CATV systems or at a remote location, for example. A scrambled video signal generator 705 receives a clear (i.e., unscrambled) video input signal and optionally scrambles the signal, for example, by suppressing the horizontal and/or vertical sync pulses, and/or by inverting the active video. The scrambled video signal generator 705 sends a control signal via a path 706 to a microprocessor controller 710 which indicates whether the signal is scrambled, and, if so, at what level, e.g., −6 dB or −10 dB, for example. "Clear" indicates a non-scrambled signal. Additional information as to which reference levels are being used and what modes of operation are in use can also be transmitted to the microprocessor controller on the path 706.

The scrambled video signal generator 705 further provides a sync tip sample-and-hold (S/H) control signal to a switch 715, while a reference (ref.) S/H control signal is provided to a switch 720. The sync tip S/H control signal commands the switch 715 to close during a synchronization period when the sync tip is being output by the signal generator 705. When the switch 715 closes, the sync tip sample $A_S$ discussed in connection with FIG. 5 is provided to a sync tip S/H circuit 725. Otherwise the switch 715 is open.

Similarly, the reference S/H control signal commands the switch 720 to close when it is desired to provide a reference signal sample $A_{RP}$ to a reference S/H circuit 730. Each of the S/H circuits 725 and 730 include conventional components such as capacitors and amplifiers which maintain the voltage of the input signal in a known manner. The microprocessor controller 710 sends a control signal to a switch 735 to couple the signal voltage from the desired S/H circuit 725 or 730 to an analog-to-digital (A/D) converter 740. The A/D converter 740 also receives control signals from the microprocessor controller 710. An eight-bit A/D converter may be used. Additionally, the A/D converter 740 may be built into the microprocessor controller 710.

The A/D converter 740 and the microprocessor controller 710 perform the various steps indicated in FIGS. 5 and 6. For example, regarding the process of FIG. 5, the sync tip value $A_S$ is corrected for attenuation, if required, normalized to a reference level, and stored, while the sample reference pulse is also corrected for attenuation, if required. The delta modulation depth term $\Delta_{MD}$ is also calculated.

Regarding the process of FIG. 6, the microprocessor controller 710 obtains the values $A_{SC}$, $A_{RF}$ and $\Delta_{RF}$.

The video signal which is output from the scrambled video signal generator 705 is coupled to a modulator 760 via a capacitor $C_1$, and biased by a resistor $R_1$ which prevents shorting out of the video signal. A capacitor $C_2$ is optionally used to stop hum and noise from getting into the video signal, but is not required. The modulator 760 modulates the video signal using an RF carrier from an RF carrier generator 780 which is processed by a voltage controlled attenuator (VCA) 770. The VCA is responsive to an RF amplitude control signal to adjust the absolute level of the RF carrier.

The video signal output from the generator 705 is similarly biased by a modulation depth control signal which is received by the resistor $R_1$. The RF amplitude control signal is provided by a charge pump 750 in response to an adjustment signal from the microprocessor controller 710. The microprocessor controller 710 may communicate with a memory (e.g., RAM) 712 which may store a look up table for converting $\Delta_{MD}$ and $\Delta_{RF}$ to corresponding adjustment signals for charge pumps 750 and 755. The memory 712 may also store values such as $A_{SC}$ for use in both the processes of FIGS. 5 and 6 to avoid the need to obtain two samples. The memory 712 may optionally be internal to the microprocessor controller 710.

The charge pumps 750 and 755 each contain a diode pair, the output of which is capacitively coupled to ground and provided to an amplifier. Each charge pump communicates with the microprocessor controller 710 via two lines which bias the diode pair. Specifically, the delta in modulation depth $\Delta_{MD}$ will be translated to an adjustment signal for the charge pump 755 to provide an increased charge to increase the depth of modulation when the corrected and normalized sync tip sample level $A_{SCN}$ is less than the corrected reference level $A_{RC}$, or to provide a decreased charge to decrease the depth of modulation when $A_{SCN} > A_{RC}$.

Additionally, the delta in RF carrier amplitude $\Delta_{RF}$ will be translated to an adjustment signal for the charge pump 750 to provide an increased charge to increase the RF carrier amplitude when the corrected sync tip sample level $A_{SC}$ is less than the reference level $A_{RF}$, or to provide a decreased charge to decrease the RF carrier amplitude when $A_{SC} > A_{RF}$.

Resistors $R_3$–$R_6$ in series with the diodes of the charge pumps 750 and 755 limit the amount of charge which can be transferred to or from the capacitor in the charge pump (e.g., capacitor $C_4$ in charge pump 750 and capacitor $C_5$ in charge pump 755). The charge is also limited by the amount of time over which the charging or discharging of the capacitor occurs. Typically a single short pulse either charges or drains enough charge to change the voltage on the capacitor less than one Least Significant Bit (LSB) of the A/D converter 740.

The video signal which is output from the modulator 760 is provided to a channel up converter, for example, for transmission over a CATV network, and to a video detector 790. The video detector 790 includes a diode which is capacitively coupled to ground via a capacitor $C_3$. A resistor $R_2$ is coupled in parallel. The diode is a rectifier, so if the waveform coming from the modulator 760 is a carrier with video modulation imposed, only the positive going half of the carrier waves will pass through the diode. The capacitor $C_3$ stores the value of the peak of the carrier, while the resistor $R_2$ leaks the signal off of the capacitor so that the capacitor is not charged up to the peak value, at which point it stops detecting.

The capacitor/resistor value are chosen to be able to discharge at a rate to follow the highest modulating frequency while, at the same time, the carrier frequency is high enough to allow the capacitor to follow the carrier waveform envelope. Since the ratio of the carrier to modulation is about ten, there are ten carrier waves for each of the highest modulating frequency, which is 4.2 MHz with the NTSC standard.

The modulation circuit 700 can operate in two control loops, one for the depth of modulation and one for the absolute carrier level. Thus, the update period can be different for each loop. Additionally, the circuit 700 can operate in only one of the modes, if desired. The optimal update rate depends on a variety of factors, including the humidity of the location of the charge pumps and the quality of the capacitors and diodes. Transistor base-collector junctions may be used as the diodes because of their superior low leakage qualities.

Figure 8:
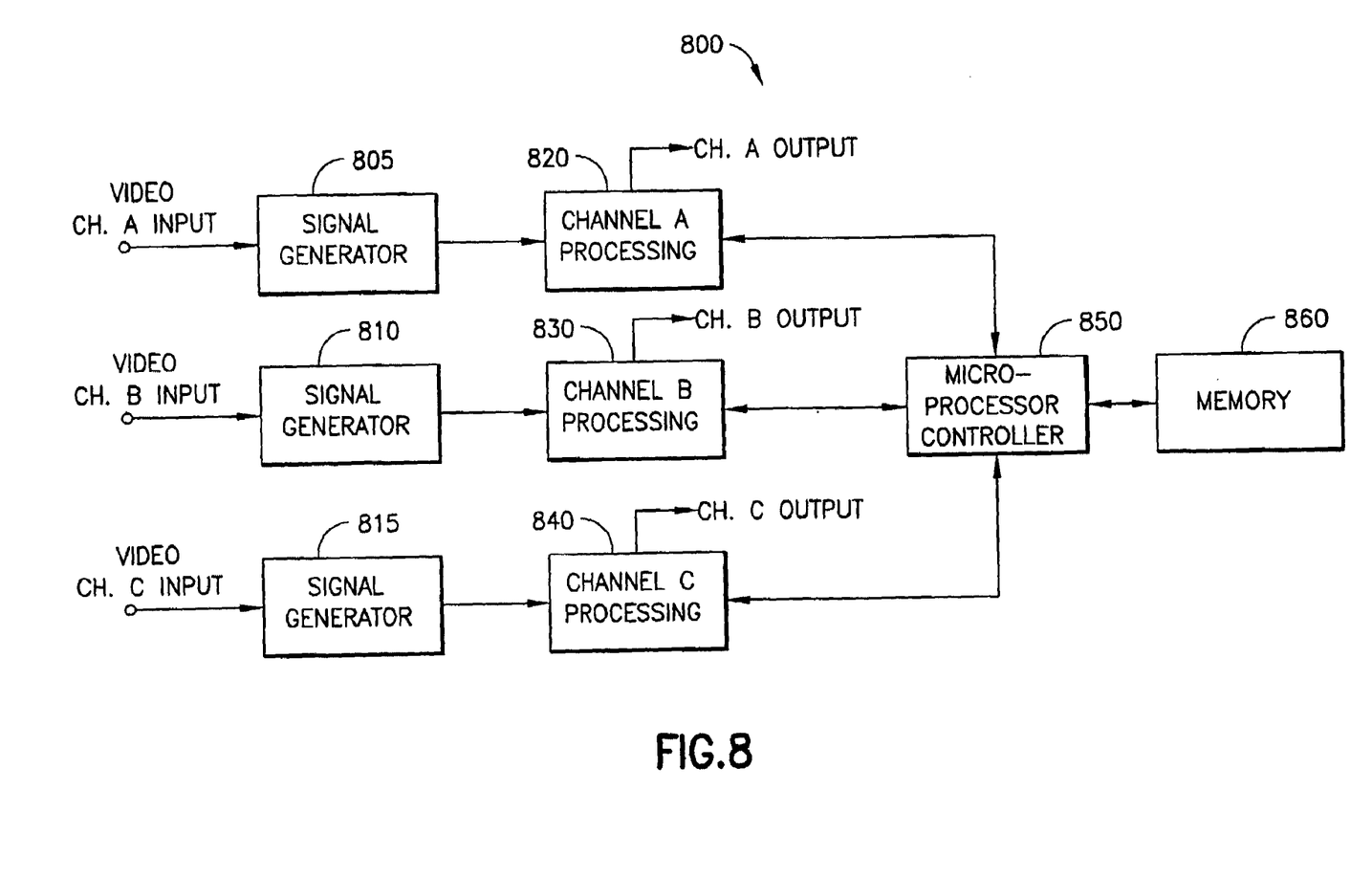
FIG. 8 is a block diagram of a scheme for providing automatic amplitude modulation of several video channels using a common microprocessor controller.

FIG. 8 is a block diagram of a scheme for providing automatic amplitude modulation of several channels using a common microprocessor controller. Further efficiencies can be achieved by fabricating several circuits with a common microprocessor controller. Dedicated microprocessor controllers for each channel are not required since the errors are small and slowly changing. Thus, the processing cycle can be very slow, e.g., several seconds or minutes or longer.

A circuit for providing automatic amplitude modulation of three video channels while using a common microprocessor controller and memory is shown in simplified form at 800. The number of channels which can be serviced by one microprocessor controller will depend on the speed of the microprocessor and the desired update cycle.

Signals from video channels A, B and C are input to respective signal generators 805, 810 and 815. Processing of the respective channels is shown at processing blocks 820, 830 and 840. The processing includes modulation, sample-and-hold circuits, and charge pumps for each channel as discussed in connection with FIG. 7. A microprocessor controller 850 which communicates with a memory 860 controls or services each of the channels on a time-sharing basis. For example, first channel A is serviced to adjust the modulation as required, then channel B, and then channel C. The cycle repeats again with channel A.

Accordingly, it can be seen that the present invention provides methods and apparatus for automatically adjusting the depth of modulation and the absolute carrier level of a video signal.

For adjustment of the depth of modulation, a sync tip of the video signal is sampled, corrected and normalized to a reference level, e.g., a 50% video level. A reference pulse is inserted into the video signal, e.g., in a sync pulse or in lines 22 and/or 23 of the vertical blanking interval. The reference pulse is sampled and compared to the normalized sync tip pulse to determine an error. The error is converted to an adjustment signal for a charge pump which increases or decreases the depth of modulation accordingly.

The use of a sync tip as a comparison portion and the 50% reference level as a reference portion are only example embodiments, as other combinations can be used. For example, the blanking level may be compared to the 50% level, or the sync tip level may be compared to the blanking level.

For adjustment of the absolute RP carrier level, the insertion of a reference pulse is not required. Instead, a reference value is stored in a memory and retrieved for comparison with the corrected sync tip pulse. An error term is computed and converted to an adjustment signal for a charge pump which increases or decreases the absolute carrier level accordingly.

Advantageously, the scheme provides automatic modulation control thereby obviating the need for periodic manual adjustments. The required circuitry can be manufactured at a relatively low cost and is suitable for use in remote locations. The present invention is believed to be particular suitable for use in developing CATV markets where low-cost, low-maintenance equipment is required.

Further efficiencies can be achieved by fabricating several circuits with a common microprocessor controller and memory which service the individual circuits on a time-sharing basis.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with an NTSC video signal, video signals corresponding to other standards, such as PAL, may also be used.

What is claimed is:

1. A method for adjusting the depth of modulation of a video signal, comprising:
   (a) detecting a comparison portion of said video signal, said comparison portion having an associated amplitude;
   (b) normalizing the comparison portion amplitude according to a reference level;
   (c) detecting a reference portion of said video signal having an amplitude at the reference level in said video signal;
   (d) generating a first error signal corresponding to a difference between the normalized comparison portion amplitude and the reference portion amplitude;
   (e) adjusting a depth of modulation of said video signal in response to said first error signal; and
   (f) periodically repeating steps (a) through (e).

2. The method of claim 1, wherein:
   said reference portion is a reference pulse which is positioned within a sync pulse of said video signal.

3. The method of claim 1, wherein:
   said reference portion is a reference pulse which is positioned within a vertical blanking interval of said video signal.

4. The method of claim 1, wherein step (e) comprises:
   converting said first error signal to a first adjustment signal; and
   providing a corresponding modulation depth control signal from a first charge pump responsive to said adjustment signal.

5. The method of claim 4, wherein:
   said corresponding modulation depth control signal is coupled to bias the video signal prior to modulation of said video signal by an RF carrier.

6. The method of claim 4, wherein said comparison portion is an attenuated sync pulse tip, further comprising:
   determining the degree of attenuation of the sync pulse tip and providing a corresponding control signal to a microprocessor controller; wherein:
   said microprocessor controller corrects the sync pulse tip amplitude to remove the attenuation according to said control signal; and
   said first error signal is generated in accordance with a difference between the normalized and corrected sync pulse tip amplitude and the reference amplitude.

7. The method of claim 1, wherein said comparison portion is an attenuated sync pulse tip, further comprising:
   correcting the sync pulse tip amplitude to remove the attenuation;
   wherein said first error signal is generated in accordance with a difference between the normalized and corrected sync pulse tip amplitude and the reference amplitude.

8. The method of claim 1, further comprising:
   providing an RF carrier reference level corresponding to an RF carrier of said video signal;
   generating a second error signal corresponding to a difference between the comparison portion amplitude prior to normalizing and the RF carrier reference level; and
   adjusting an amplitude of said RF carrier in response to said second error signal.

9. The method of claim 8, wherein the step of adjusting an amplitude of said RF carrier comprises:
   converting said second error signal to a second adjustment signal; and providing a corresponding RF amplitude control signal from a second charge pump responsive to said second adjustment signal.

10. The method of claim 9, wherein:

said first error signal is converted to a first adjustment signal, and said first adjustment signal is provided to a first charge pump to enable said first charge pump to provide a corresponding modulation depth control signal.

11. The method of claim 8, wherein:

said comparison portion is a sync pulse tip.

12. The method of claim 1, wherein:

said reference portion is used as an inversion level pulse for the video signal.

13. The method of claim 1, wherein:

said comparison portion is a blanking portion of the video signal.

14. The method of claim 1, wherein:

said reference portion is a 50% video level.

15. The method of claim 1, wherein:

said comparison portion is a sync pulse tip.

16. The method of claim 15, wherein:

said reference portion is a blanking portion of the video signal.

17. An automated modulation method for processing a plurality of video signals in accordance with the steps of claim 1, comprising:

converting the first error signal for each of said plurality of video signals to corresponding first adjustment signals in a time sharing manner; and providing a corresponding modulation depth control signal for each video signal in accordance with the respective first adjustment signal.

18. An automated modulation method for processing a plurality of video signals in accordance with the steps of claim 1, wherein step (f) is performed on a rotating basis among said plurality of video signals.

19. A method for adjusting the RF carrier level of a video signal, comprising:

(a) detecting a comparison portion of said video signal, said comparison portion having an associated amplitude;

(b) providing an RF carrier reference level corresponding to an RF carrier of said video signal;

(c) generating an error signal corresponding to a difference between the comparison portion amplitude and the RF carrier reference level;

(d) adjusting an amplitude of said RF carrier in response to said error signal; and (e) periodically repeating steps (a) through (d).

20. The method of claim 19, wherein step (d) comprises:

converting said error signal to an adjustment signal; and providing a corresponding RF amplitude control signal from a charge pump responsive to said adjustment signal.

21. An automated method for processing a plurality of video signals in accordance with the steps of claim 19, wherein step (e) is performed on a rotating basis among said plurality of video signals.

22. An automated method for processing a plurality of video signals in accordance with the steps of claim 19, comprising:

converting the error signal for each of said plurality of video signals to corresponding adjustment signals in a time sharing manner; and providing a corresponding RF carrier level control signal for each video signal in accordance with the respective adjustment signal.

23. The method of claim 19, wherein:

said comparison portion is a sync pulse tip.

24. The method of claim 19, wherein:

said comparison portion is a blanking level of the video signal.

25. The method of claim 19, wherein:

said RF carrier reference level is a 50% video level.

26. The method of claim 19, wherein:

said RF carrier reference level is a blanking level of the video signal.

* * * * *